(12) United States Patent
Howard (10) Patent No.: US 10,184,518 B2
(45) Date of Patent: Jan. 22, 2019

(54) ROTOR BEARING TEMPERATURE SENSOR

(71) Applicant: Safran Electrical and Power UK Ltd, Buckinghamshire (GB)

(72) Inventor: Darren Howard, Buckinghamshire (GB)

(73) Assignee: Safran Electrical and Power UK Ltd, Buckinghamshire (GB)

( * ) Notice: Subject to any disclaimer, the term of this patent is extended or adjusted under 35 U.S.C. 154(b) by 0 days.

(21) Appl. No.: 15/502,628

(22) PCT Filed: Aug. 12, 2015

(86) PCT No.: PCT/GB2015/052330
§ 371 (c)(1),
(2) Date: Feb. 8, 2017

(87) PCT Pub. No.: WO2015/024110
PCT Pub. Date: Feb. 18, 2016

(65) Prior Publication Data
US 2017/0248165 A1     Aug. 31, 2017

(30) Foreign Application Priority Data
Aug. 12, 2014   (GB) .................................. 1414299.6

(51) Int. Cl.
*F16C 19/52* (2006.01)
*F16C 33/58* (2006.01)

(52) U.S. Cl.
CPC .......... *F16C 19/525* (2013.01); *F16C 33/586* (2013.01)

(58) Field of Classification Search
CPC ............................ F16C 19/525; F16C 41/002
See application file for complete search history.

(56) References Cited

U.S. PATENT DOCUMENTS 8,123,411 B2 *    2/2012  Norimatsu ..........  B60B 27/0005
                                                        384/448
2016/0076586 A1 * 3/2016  Campbell ............. F16C 19/386
                                                        384/448

FOREIGN PATENT DOCUMENTS

| EP | 2400603 | 12/2011 |
| GB | 2062860 | 5/1981 |
| GB | 2204819 | 11/1988 |
| JP | 2003004036 | 1/2003 |
| JP | 2003287436 | 10/2003 |

(Continued)

OTHER PUBLICATIONS

International Search Report and Written Opinion for International Application No. PCT/GB2015/052330, dated Oct. 26, 2015, 10 pages.

(Continued)

*Primary Examiner* — James Pilkington
(74) *Attorney, Agent, or Firm* — RatnerPrestia (57) ABSTRACT

A bearing assembly is provided with an improved mounting for a temperature sensor for monitoring a temperature of a race of the bearing. The assembly includes a temperature sensor assembly mounted to the race of the bearing and a thermal insulator arranged to thermally insulate the sensor from heat exchange with the surrounding environment and/or neighboring components to which the bearing or assembly is mounted, in order to improve accuracy, reliability and speed of response of the temperature sensor readings.

20 Claims, 6 Drawing Sheets

(56) References Cited

FOREIGN PATENT DOCUMENTS

| JP | 2010139303 | 6/2010 |
|----|------------|--------|
| JP | 2014163434 | 9/2014 |

OTHER PUBLICATIONS

Great Britain Search Report for GB Application No. 1414299.6, dated Feb. 6, 2015, 2 pages.
International Preliminary Report on Patentability and Written Opinion for International Application No. PCT/GB2015/052330, dated Feb. 14, 2017, 8 pages.

* cited by examiner

ROTOR BEARING TEMPERATURE SENSOR

This application is a U.S. National Phase application of PCT International Application No. PCT/GB2015/052330, filed Aug. 12, 2015, which claims the benefit of GB 1414299.6, filed Aug. 12, 2014, both of which are incorporated by reference herein.

FIELD OF THE INVENTION

The present invention relates to a mounting arrangement for a temperature sensor. In particular, the invention relates to a mounting arrangement for mounting a sensor for detecting a temperature in a bearing, preferably a roller bearing or a ball bearing.

BACKGROUND OF THE INVENTION

Modern machinery has long included rotating components, which are generally supported by bearings, to journal the rotating part in a body, chassis, frame or other structural element of the machinery. Bearings in rotation generate heat due to friction. The amount of heat generated will vary depending upon the state of lubrication of the bearing, the magnitude of lateral loads being transmitted through the bearing and its speed of rotation, among other factors.

Overheating in bearings can be a problem, since it can result in distortion and/or heat damage to components of the bearing. Additionally, such overheating can cause distortion, fatigue and heat damage to surrounding components or machinery in which the bearing is mounted. This can all result in reduced life of the components of the bearing itself and of machinery into which it is mounted. To address this, control feedback systems can be implements, which monitor a temperature conditions at or near to a bearing, and the machinery into which the bearing is mounted can be slowed or shut down to reduce or prevent damage due to overheating or operation at excessive temperatures.

In a known bearing mounting arrangement, a temperature sensor is mounted within a structure to which a bearing is mounted, at distance from the bearing, to monitor conditions of the bearing. This avoids issues of housing the temperature sensor in close proximity to the bearing, which can be problematic, since loads and fatigue limits must be carefully calculated where a bearing is mounted and modifying the structure in such critical regions can be complex. Further, the presence of rotating components in close proximity to a bearing can make it difficult to mount a temperature sensor close to parts of a bearing which are vulnerable to overheating.

The present invention seeks to address the drawbacks of known temperature sensor mounting arrangements.

SUMMARY OF THE INVENTION

According to a first aspect of the present invention there is provided a bearing, having a first race and a second race; a temperature sensor assembly, comprising a temperature sensor, mounted to one of the first and second races of the bearing; and a first thermal insulator arranged to thermally insulate the temperature sensor from its surroundings.

The assembly of the present invention permits more accurate monitoring of a temperature of a race of a bearing, especially in cooled environments, which are cooled by fluids such as air, water or oil, where heat generated in a race of a bearing may be relatively quickly dissipated to surrounding components or to the surrounding environment, or to coolants where they are present. Such dissipation can happen quickly enough that it is not detected by a sensor, but slowly enough that damage is caused to components which overheat. High temperature gradients can therefore be present in the region of a bearing and so mounting a temperature sensor at or in close proximity to a race of bearing can be advantageous. The arrangement of the invention includes a thermal isolator which generally isolates or insulates the sensor assembly from heat exchange with the surrounding environment and so reduces the effect on the sensor readings of either heating or cooling in the surrounding environment or surrounding components and can also therefore be a thermal insulator. Traditionally, sensors mounted to the bearing structure, or directly to the bearing itself, suffer from a heat sink effect of surrounding structures and components and so do not accurately detect temperature rise with a sufficiently timely response before bearing failure, which can result in a machine failure.

The temperature sensor assembly may further comprise a thermal conductor element disposed between the temperature sensor and the race to which the sensor assembly is mounted. Such a thermal conductor can help to provide more uniform contact and/or more uniform heat transfer between the temperature sensor assembly and the race whose temperature it is to monitor, and so can improve accuracy, precision and speed of response of the temperature sensing provided by the sensor.

The first thermal insulator may be arranged to insulate the sensor and the thermal conductor from their surroundings. This can help reduce heat loss to the surroundings from the sensor assembly, resulting in improved accuracy and speed of response of the temperature sensor readings, particularly to high temperature spikes in the bearing system, which can go undetected if sensor response is not sufficiently accurate and rapid.

The bearing may be mounted to a structure and the first thermal insulator may be disposed between the sensor and the structure. This can help to prevent heat from being conducted away from the sensor by the structure, which can help to reduce the cooling effect of surrounding components or structures on the sensor and the heat path from the race to the sensor. This cooling effect can otherwise hinder the temperature sensor from properly reading the temperature of the bearing race.

The assembly may further comprise a housing, the temperature sensor being located between the housing and the race of the bearing. The housing may be provided separately from and in addition to components which are required for the mechanical functioning of the machinery to which the bearing is mounted. The housing can therefore provide both mechanical protection to the temperature sensor and can act to ensure that the temperature sensor or temperature sensor assembly is correctly located in relation to the race of the bearing.

The temperature sensor and the conductor may be both located between the housing and the race of the bearing. This helps to protect and maintain both of these components in contact with the race of the bearing, particularly at a location at or near to areas where a hot spot may arise, close to the running track of the bearing.

The first thermal insulator may be disposed between the housing and the temperature sensor. In this configuration, the housing can help to locate the first thermal insulator correctly adjacent the temperature sensor, to avoid the housing becoming a component which conducts heat away from the temperature sensor, and this arrangement contributes to preventing cooling the temperature sensor and therefore aids its ability to correctly monitor the temperature of the bearing to which it is mounted.

The temperature sensor may be disposed between the first thermal insulator and the race of the bearing. This helps to ensure that heat generated within the bearing is maintained at the temperature sensor so that the temperature sensor can detect such heat before it is dissipated. The first thermal insulator may comprise a first portion, arranged substantially radially with respect to the bearing, and a second portion, arranged substantially axially with respect to the bearing. These two portions can thus act to insulate the temperature sensor in both axial and radial directions to prevent dissipation of heat substantially in those two directions.

The first portion may be a substantially planar portion, which is radially oriented with respect to the bearing, and the second portion may be a substantially part-cylindrical portion. These faces can therefore effectively maintain the temperature sensor, in thermal contact with a substantially annular bearing, in improved thermal isolation from the surroundings.

The bearing assembly may comprise first and second thermal insulators. The second thermal insulator may be arranged substantially opposite at least a part of the first thermal insulator. This can enable assembly of the two thermal insulators around the temperature sensor to reduce the dissipation of heat from the temperature sensor in any direction other than back through the bearing whose temperature it is monitoring. This arrangement can result in a reduction in the conduction of heat away from the temperature sensor in the directions of the thermal insulators.

The first or second thermal insulator may be arranged between the temperature sensor and a structure to which the bearing is mounted. An arrangement can be provided in which the first thermal insulator is arranged to thermally insulate the temperature sensor from its housing and the second thermal insulator can thermally insulate the temperature sensor from a structure to which the bearing is mounted.

One of the first and second thermal insulators may be substantially disc-shaped. This can be of particular benefit, if the bearing is mounted to a substantially disc-shaped structure. A disc-shaped insulator can be more convenient to assemble with a substantially annular bearing race and/or a planar or disc-shaped mounting surface to which the bearing may be mounted. The geometry of the insulator or isolator disc can however be governed by the required interface geometry for the structure to which the bearing is mounted.

The assembly may further comprise a pre-loading mechanism for pre-loading at least the sensor, and optionally the sensor assembly, against the race of the bearing. Such pre-loading ensures improved thermal conductivity between the bearing race and the temperature sensor and/or any conductor surrounding the temperature sensor or located between the temperature sensor and the bearing race. Further, with the aid of the pre-loading device, positive contact between the sensor and the bearing race, preferably via the sensor housing and/or the conductor, can be established. Adjustment in this way can reduce the need or strict tolerances when manufacturing components of the sensor assembly and/or the housing.

The pre-loading mechanism may be disposed in the housing, or arranged to bias the temperature sensor away from the housing and toward the bearing race. The pre-loading mechanism may comprise a threaded adjuster, or other mechanical adjustment means, and may additionally or alternatively comprise a resilient biasing member for biasing the temperature sensor and/or its thermal conductor element towards the bearing race to improve thermal contact there between.

The race of the bearing may comprise one or more flange portions for mounting the bearing to a structure or to a rotating component. The temperature sensor may be mounted substantially adjacent to at least one of the flange portions, which can provide a mechanical stop to help locate the sensor radially and/or circumferentially on the bearing. It has not in the past been considered practical to locate a temperature sensor adjacent a flange portion of the bearing, which is arranged to mount the bearing to a structure or to a rotating component, whereas the arrangement of the present invention now permits this.

Plural flange portions may be arranged in a substantially circular or arcuate array around the race of the bearing, and the temperature sensor assembly and/or the thermal conductor element may be arranged substantially between an arc of the flange portions and the bearing race, preferably in contact with the bearing race. This allows the sensor to be located in a proximal arrangement relative to the race whose temperature it is intended to monitor. This can also facilitate positive location of the temperature sensor assembly on the bearing race adjacent the flange portions.

The housing may be attached to the race of the bearing at the one or more flange portions. This allows efficient use of existing structures to mount the housing and the components which it contains to the bearing.

The bearing may be attached to a structure or to a rotating component via fixing means at the flange portion or portions and the housing may be attached to the flange portion or portions by the same fixing means. This allows an efficient structure to be put in place for holding the temperature sensor assembly in place upon the bearing race.

At least one of the sensor and/or the conductor element may comprise a profile shape arranged to mate with at least one of the flange portions, to locate the temperature sensor circumferentially on the race of the bearing.

At least one of the first and second thermal insulators may be disposed between at least a part of the bearing race and the component or structure to which the bearing is mounted. This is not always traditionally desirable, since this can create a further component to locate between the bearing race and a component or structure to which it is mounted, making assembly more complex. Further, dimensional tolerances associated with the size and dimensions of the thermal insulator will also have to be taken into account in the calculation of overall tolerances in the assembly, which can render manufacture and design more complex and costly.

The thermal insulator may be disposed on a load path of fixing means for fixing the bearing to the component or structure to which the bearing is mounted. In defining a load path, it is intended to indicate a path along which a load created by fixing means is reacted within the assembly. For example, locating the thermal insulator between a flange and a surface and using a bolt as fixing means to bolt the flange to the surface places the thermal insulator on the load path created by the bolt, subjecting it to significant crushing forces. This can be problematic in the case of certain materials and so has been avoided in the past.

The bearing may comprise plural roller elements located between its first and second races.

The bearing may further be arranged for journaling radial loads and may therefore comprise an inner race and an outer race, located substantially in the same plane as one another, so that the inner race rotates within the outer race.

The temperature sensor may be mounted at least partially in a cooled chamber of a machine. In such instances, the thermal insulation of the present invention is particularly advantageous, since heat is rapidly dissipated from the surrounding environment and surrounding components and so may be difficult to detect in the absence of the arrangement of the present invention. In other implementations, heat dissipation may be less of an important factor and the mounting of the temperature sensor to the bearing may be of greater importance. In such instances, the thermal insulator may not be essential and could be omitted, while features of the mounting arrangement for the sensor assembly may remain advantageous.

The temperature sensor may be mounted in or adjacent a cooled wall of the cooled chamber. This makes the thermal insulator of the present invention particularly advantageous for insulating the temperature sensor from the cooling effect of the cooled wall.

BRIEF DESCRIPTION OF THE DRAWINGS

Examples of the present invention are described below in detail with reference to the accompanying drawings, of which.

DETAILED DESCRIPTION OF EMBODIMENT(S)

Figure 1:
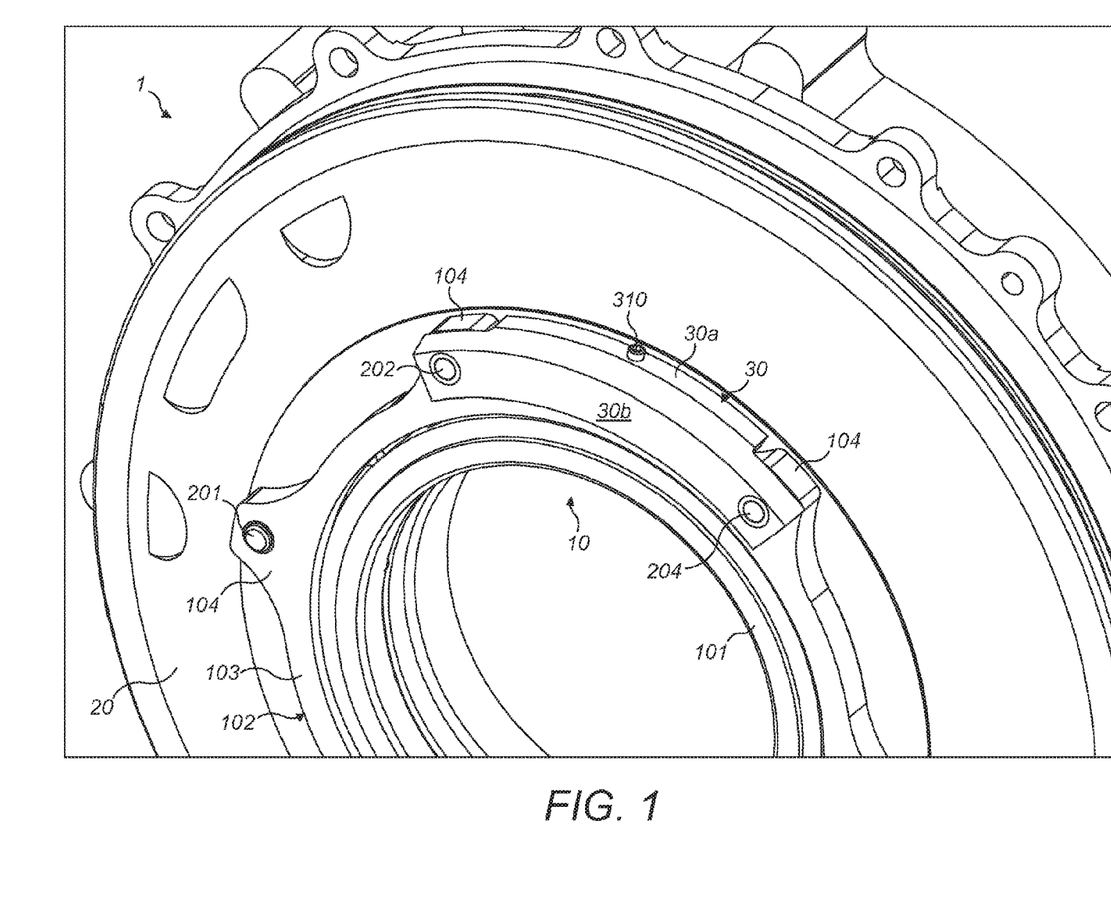
FIG. 1 illustrates an assembly of the present invention, showing an outside view of a housing containing a temperature sensor assembly of the present invention.

FIG. 1 shows a bearing of assembly 1 of the present invention. In the illustrated embodiment, the bearing assembly of the invention is provided in a generator. The problems herein will be described with respect to such a generator, in particular an air or oil cooled generator, but the heating and temperature monitoring problems addressed by the invention apply equally to many other types of machines, as will become apparent on reading the following description.

The illustrated assembly comprises a bearing 10. The bearing 10 comprises an inner race 101 and an outer race 102. In the illustrated embodiment, the bearing 10 is mounted in a structure, which takes the form of a wall section 20. In the embodiment described, wall section 20 divides a chamber which contains a main stator (not shown) of a generator from a further chamber which is hermetically sealed and divided from the chamber containing the stator. The chamber containing the stator, in which the temperature sensor of the present invention is mounted, is a cooled chamber, since heat is generated by the stator as the generator carries out its usual function of generating electrical current from rotational motion. Such generators are conventional and are not described herein in any further detail. However, it will be appreciated that similar conditions rendering the present invention advantageous will be experienced in a range of other machines. These can include engines, motors, turbines, pumps and essentially any other type of machine with bearings which may generate heat. The fact that the chamber is cooled is not essential to the invention, but can in some situations, render the advantages of the present invention more pronounced. The chamber can be oil cooled or air cooled. Oil cooling can be used in higher power generators, while air cooling can be sufficient in generators operating at lower power levels.

In arrangements such as that illustrated in FIG. 1, known examples have mounted a temperature sensor within wall 20, at a location adjacent the bearing 10. However, in any such arrangement, the wall 20, due its thermally conductive materials, generally a metallic material, has the effect of dissipating heat generated within the bearing 10. Moreover, if the wall 20 is a wall of a cooled chamber, then that effect may be even more pronounced, since the cooling effect of the cooled chamber will dissipate heat more rapidly through and away from wall 20 and away from any temperature sensor mounted in wall 20. In such arrangements, there can therefore arise situations where a local temperature peak experienced in a race of the bearing 10 may not be detected by a temperature sensor seeking to monitor conditions of the bearing. This can result in an undetected bearing overheat condition, and can reduce the life of the bearing 10, or can ultimately result in failure of the bearing 10 before the end of its expected life.

The outer race 102 comprises relatively narrow portions 103, which have a radial dimension which is as determined by the mechanical strength required of the outer race. Outer race 102 further comprises relatively wide portions 104, which have a radial dimension greater than the relatively narrow portions 103. Relatively wide portion 104 can also be termed flange portions, since they act to form flange portions extending from the race 102, for attaching the race 102 to the wall 20 via fixing means 201.

The bearing assembly of the present invention seeks in particular to monitor the temperature of the relatively narrow portions 103 of the bearing outer race 102, since these can be especially susceptible to heat build-up. This is because they lack contact with any heat dissipating components, such as flange portions 104, or any part of wall 20 to which the outer race may be mounted and to which heat may be dissipated.

The illustrated temperature sensor assembly is therefore mounted in contact with a relatively narrow portion 103 of the outer race 102 and is located between adjacent flange portions 104.

Figure 2:
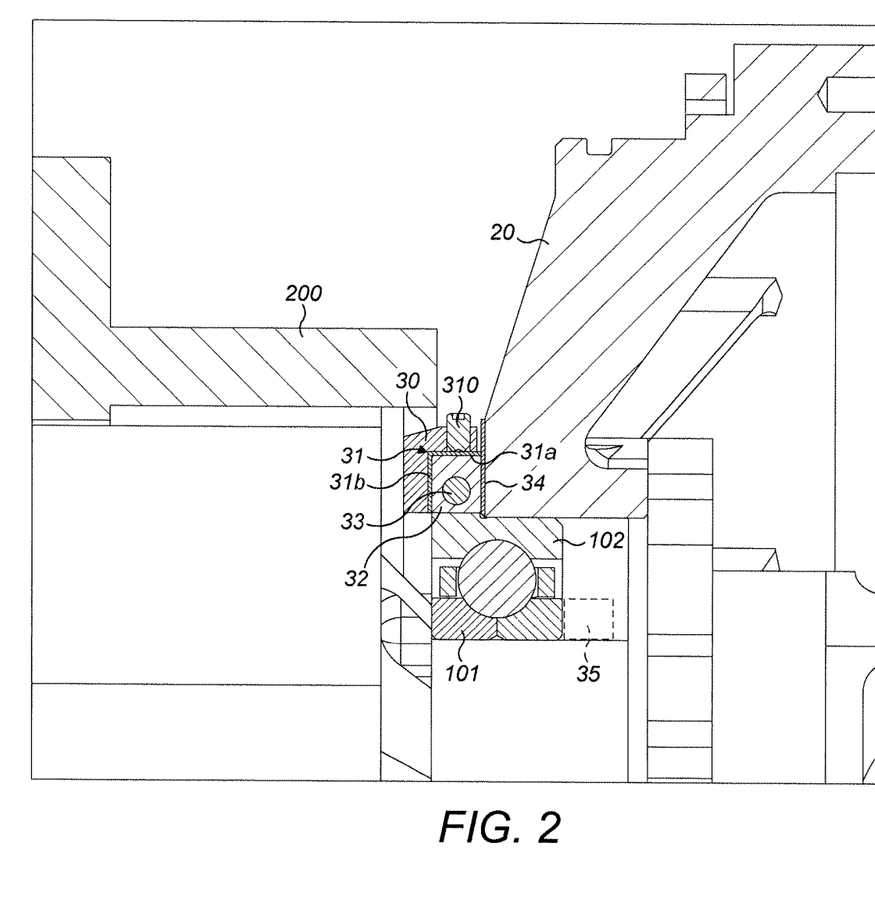
FIG. 2 shows a section through the assembly illustrated in FIG. 1.

Although the illustrated assembly shows the flange portions and the temperature 5 sensor assembly mounted to the outer race, there may be instances where an inner race comprises either radially or axially projecting flange portions, to which a temperature sensor assembly of the present invention may be mounted in order to monitor temperature conditions of the inner race 101. FIG. 2 schematically illustrates a temperature sensor 35 mounted to the inner race.

FIG. 1 further shows a view of the outside of a housing 30 which acts to hold the temperature sensor assembly of the present invention in place against the bearing outer race 102. Housing 30 has a first wall portion 30b, which is arranged in a substantially radial plane of the bearing, to maintain the temperature sensor assembly in a relatively fixed axial location relative to the bearing. The housing further comprises a second wall portion 30a, which is arranged radially around the temperature sensor, and having a substantially part-cylindrical form, to maintain the temperature sensor assembly in a fixed radial position relative to the bearing.

Housing 30 is provided with pre-loading means 310. In this instance, the illustrated pre-loading means is in the form of a threaded adjustor and so provides an adjustable mechanism for preloading the temperature sensor assembly against the outer race 102, but can also be a compression spring. Other forms of pre-loading means may be envisaged, such as biasing means in the form of a spring or other resilient member, which can be located between the housing 30 and the temperature sensor assembly, as will become apparent as further detail of the assembly is described in the following figures. The temperature sensor assembly is preferably provided between the bearing race and the preferably adjustable pre-loading means.

FIG. 2 shows a section through the assembly shown in FIG. 1. The main stator 200 of the generator of this embodiment is illustrated in this figure to illustrate its arrangement relative to the assembly of the present invention. The location of outer race 102 within wall 20 can be more clearly seen in this figure. The outer race is mounted with a clearance or interference fit with the wall 20. The cross-section of FIG. 2 through the temperature sensor assembly of FIG. 1, at the location of pre-loading means 310, gives a clearer illustration of the components inside the housing 30. Inside housing 30 there is located a temperature sensor 33. Surrounding the temperature sensor is an optional thermal conductor element 32. Located between temperature sensor 33 and housing 30 is a thermal insulator 31. The thermal conductor element 32 may surround the temperature sensor 33. As can be seen in the figure, pre-loading means 310 can be used to apply a force against any or all of the temperature sensor 33, the thermal conductor element 32 and the thermal insulator 31.

A further thermal insulator 34 is also located between the temperature sensor 33 and the structure 20, to prevent heat dissipation away from the temperature sensor to the structure before such heat has been properly sensed by the temperature sensor 33.

Thermal conductor element 32 may be formed from copper or aluminium or other thermally conductive materials, which have particularly good thermal conducting properties and so are well suited to the present invention. Although many materials are thermally conductive and very few are completely thermally insulative, suitable materials preferably have a thermal conductivity similar to or higher than that provided by copper alloys or aluminium alloys or other generally thermally conductive materials.

Thermal insulators 31 and 34 preferably have a low coefficient of thermal conductivity, this should be ideally lower than the thermal conductivity of copper or aluminium, preferably significantly lower, to substantially prevent or significantly reduce the conduction of heat away from the sensor. Any generally known thermally insulating material can be advantageous in this implementation.

Thermal insulator 31 has an axially extending portion 31a and a radially extending portion 31b. Since each of these portions extends circumferentially around a part of the bearing 10, each has a substantially plate-like form as can be seen from the figures. Radially extending portion 31b is substantially planar and is located in a plane substantially perpendicular to the axis of rotation of the bearing, being located axially displaced from the temperature sensor assembly, and located adjacent the temperature sensor assembly. Axially extending portion 31a has a part-cylindrical form and is radially displaced from the temperature sensor assembly, and located adjacent the temperature sensor assembly.

It can also be seen that further thermal insulator 34 is arranged substantially opposite the radially extending portion 31B of the thermal insulator 31 and the temperature sensor 33 is located between those two thermal insulators. The cylindrically formed axially extending portion 31A is arranged radially outside temperature sensor 33, and so a circumferentially extending enclosure is formed out of the thermal insulators 31 and 34, with the open face of the enclosure being directed toward the outer race 102 of the bearing. By virtue of this arrangement, the principle path for heat to be transmitted to and from the temperature sensor 33 is via the face of outer race 102 which is contacts, preferably via its thermal conductor element 32.

Figure 3:
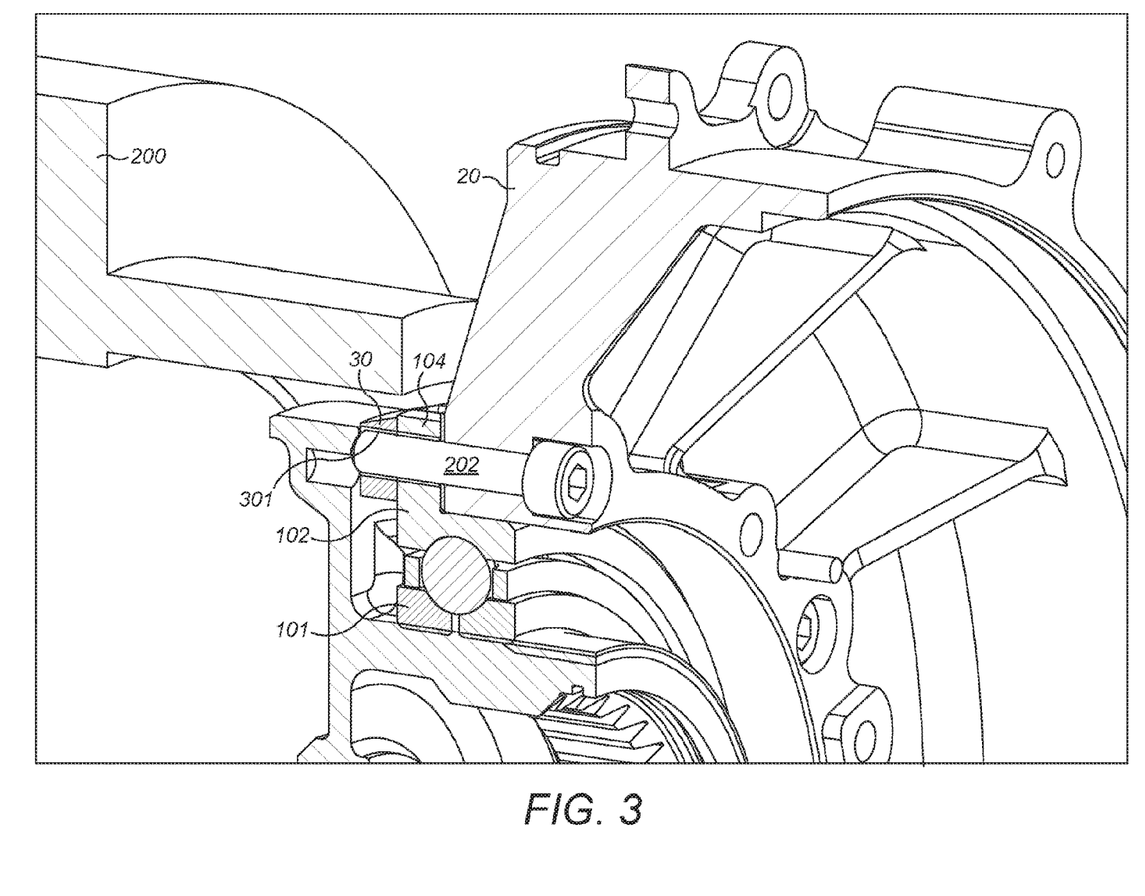
FIG. 3 shows an alternative section through the assembly of FIGS. 1 and 2.

FIG. 3 illustrates a further section through the assembly shown in FIGS. 1 and 2, this section is through the fixing means 202 of FIG. 1. As can be seen in the figure, the preferred housing 30 contains a threaded portion 301, and a preferred bolt 202 comprises a corresponding threaded portion arranged to engage the threaded portion 301 of the housing 30. Bolt 202 also preferably further comprises a second threaded portion arranged to engage with flange portion 104 of the outer race 102, to fix the outer race 104 relative to the wall 20.

Figure 4:
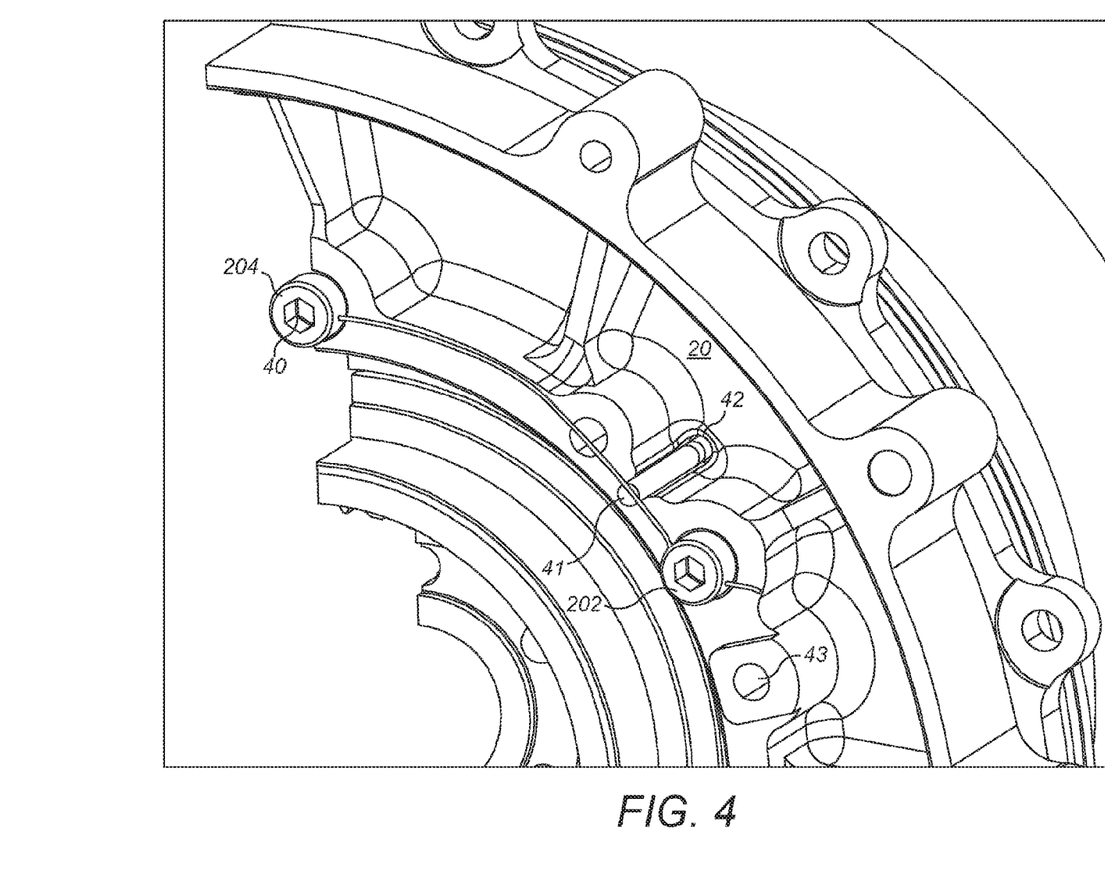
FIG. 4 shows a view of the assembly of FIG. 1 viewed from an opposite side to that shown in FIG. 1.

FIG. 4 illustrates a side of wall 20 opposite the side of wall 20 to which the temperature sensor assembly is mounted. Bolts 202 and 204 are lodged within the wall 20 and their heads can be lock wired together with a tie wire 40 to secure them in place to prevent them becoming loose or un-tightened during vibration conditions. FIG. 4 also illustrates an opening 42 which is provided in wall 20, which allows a signal wire 41 to pass through the wall 20. This wire 41 can bring signals out of the cooled chamber, from the temperature sensor 33 to a controller, and can provide power to the temperature sensor if necessary. Opening 42 will be sealed with a grommet. The opening 42 is provided with smooth radius to prevent excessive wear on temperature sensor wire 41. Use of the temperature sensor assembly of the present invention only requires a small opening to be provided in wall 20 for the passage of the wire 41. This is in contrast to previous implementations, where the whole temperature sensor itself would have to be incorporated into the structure of wall 20, which required more material and complex features to be provided in wall 20 to incorporate the sensor into an opening such as opening 43, for example. A temperature sensor would previously have been be incorporated by a direct threaded engagement in such an opening and, as is evident from the figure, it is necessary to build-up additional material around opening 43 or any opening provided in wall 20 to accommodate fixing means, sensors or components. Therefore, use of the temperature sensor assembly of the present invention reduces the need for the use of such additional features and materials in wall 20.

Figure 5:
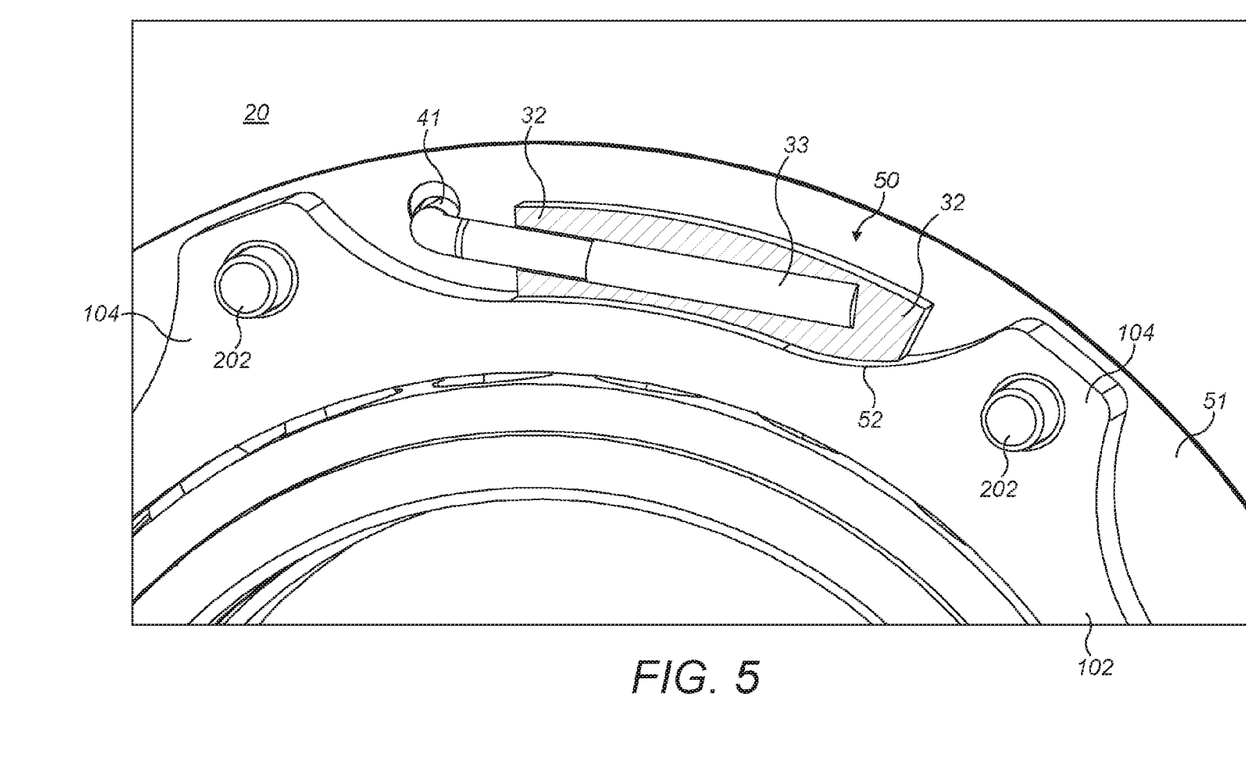
FIG. 5 shows an alternative section through the temperature sensor assembly of FIG. 1.

FIG. 5 illustrates a section cutting through the temperature sensor assembly 50 in the region of flanged portions 104 of the outer race 102 of the assembly of FIG. 1. The arrangement of thermal conductor element 32 around temperature sensor 33 can be more clearly seen in this figure. The temperature sensor 33 may therefore be a substantially elongate temperature sensor, or a preferably cylindrical wire temperature sensor, and it may be disposed in an elongate hole or opening in the thermal conductor element 32. Wire 41 for transporting power and/or signals to and from the temperature sensor 33 passes through the wall 20 and also through thermal isolator/insulator disc 51. As can be seen in the figures, thermal insulator disc 51, which is also the further thermal insulator 34 of FIG. 2, is located between flange portions 104 and wall 20. It will be appreciated that when fixing means 202 and 204 are engaged via threads with flange portions 104, they will, when tightened, create a compressive force or load which passes through flange portions 104, through thermal insulator disc 51 and on to wall 20. Therefore, when the fixing means 204 are tightened, a compressive force will be applied to thermal isolator/insulator disc 51. For this reason, its thickness must be catered for in the dimensioning of components for the assembly and it is preferable if it is made from a material which is highly resilient to compressive forces, so that it does not compress or deform over the life of the assembly and create unwanted slack or play in the fixing of the flange portions 104 to wall 20. The preferred material of the illustrated embodiment is a Kevlar™ sheet, which has a compressive strength similar to or better than the wall structure 20 and/or the bearing race 102. Any such material having the desired thermally insulating properties and the desired compressive strength can also be used.

It can further be seen that the temperature sensor assembly 50 comprises a profile portion 52, which is configured to mate with a corresponding profile of the outer race 102 to which it is mounted. This profile, preferably in combination with housing 30 (not shown in FIG. 5), acts to retain the temperature sensor assembly 50 from moving in a circumferential direction around the outer race 102 to which it is mounted.

Figure 6:
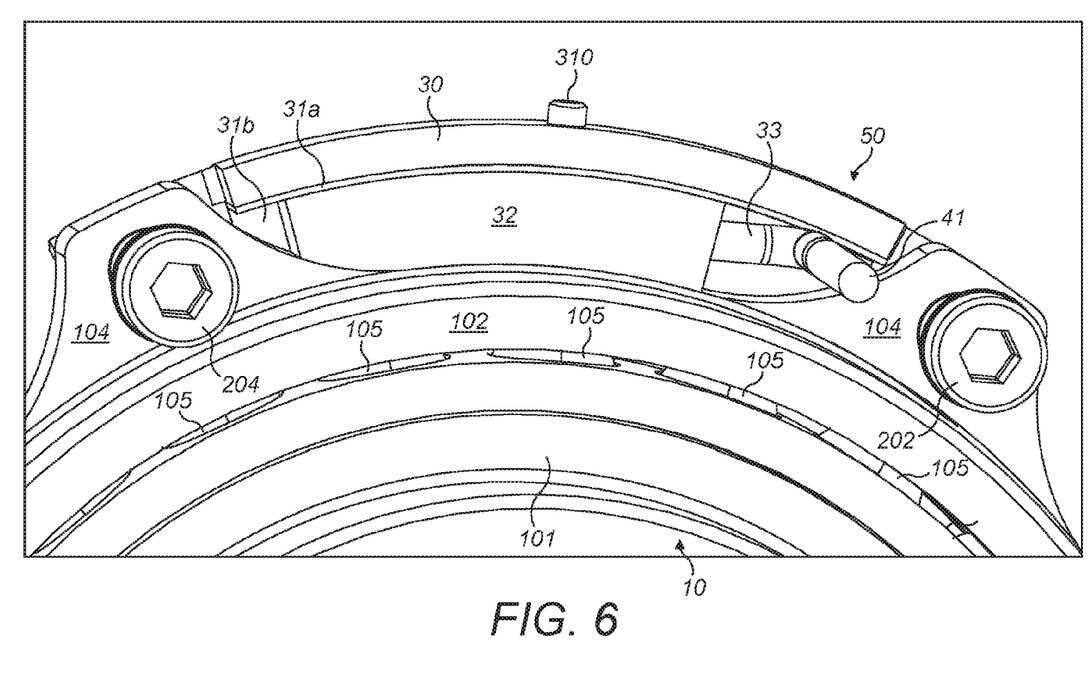
FIG. 6 shows a view of a subassembly of the assembly shown in FIG. 1, viewed from an opposite side of the bearing to that shown in FIG. 1.

FIG. 6 shows a view of the temperature sensor assembly 50, viewed from a direction of wall 20, with the wall 20 removed from the view, to illustrate internal components of the assembly 50. It can be seen that an upper or outer part of the insulator 31 has an arc shaped profile, substantially parallel with the profile of the race 102. This part also has an axial dimension, and it therefore has a part-cylindrical form.

The arrangement of the power/signal wire 41 for the sensor can also be seen, and it comprises a substantially right-angled bend in order to take signals from the temperature sensor 33, to carry them in a substantially axial direction relative to the axis of rotation of the bearing. The configuration of the wire 41 can also help to locate the sensor 33 circumferentially on the bearing race 102. The bearing 10 can also be seen to comprise roller elements 105, located between the inner 101 and outer 102 races. The invention could however also be applied to bearings which do not include such roller elements, since heat is generally generated in any kind of bearing. It should also be understood that, although the illustrated embodiment relates to a bearing having inner and outer races, arranged to journal a shaft and to react radial forces in the shaft, perpendicular the axis of rotation of the shaft, there are other implementations where bearings are arranged with axially opposed races, for journaling shafts which carry axial loads, generally known as thrust bearings. The present temperature sensor arrangement could also be applied to other such bearing arrangements.

Although the invention is described in relation to temperature sensors, the problems associated with signal attenuation due to location of a sensor remotely from the component to be monitored can be common to other types of sensor, such as vibration sensors, torque sensors, or strain sensors, for example. Any features of the invention, and in particular the features of the invention which allow its location in proximity to a component to be monitored, can therefore be advantageous in conjunction with any other type of sensor.

Although the invention has been described above with reference to one or more preferred embodiments, it will be appreciated that various changes or modifications may be made without departing from the scope of the invention as defined in the appended claims.

The invention claimed is:

1. A bearing assembly comprising:
a bearing, having a first race and a second race;
a temperature sensor assembly, comprising a temperature sensor, mounted to one of the first race and the second race;
thermal insulation arranged to thermally insulate the temperature sensor from its surroundings; and
a housing for the temperature sensor;
wherein the temperature sensor and a first portion of the thermal insulation is located in a first thermally conductive path from the housing to the race of the bearing; and
wherein the bearing is mounted to a structure, and a second portion of the thermal insulation is disposed in a second thermally conductive path from the temperature sensor to the structure.

2. The bearing assembly according to claim 1, the temperature sensor assembly further comprising a thermal conductor element disposed between the temperature sensor and the race to which the temperature sensor assembly is mounted.

3. The bearing assembly of claim 2, wherein the first portion of the thermal insulation is arranged to insulate the sensor and the thermal conductor element from their surroundings.

4. The bearing assembly of claim 1, wherein the temperature sensor, the first portion of the thermal insulation and a thermal conductor element are all located between the housing and the race of the bearing.

5. The bearing assembly of claim 1, wherein at least part of the first portion of the thermal insulation is disposed between the housing and the temperature sensor.

6. The bearing assembly of claim 1, wherein at least part of the temperature sensor is disposed between the first portion of the thermal insulation and the race of the bearing.

7. The bearing assembly of claim 1, wherein the first portion of the thermal insulation comprises a first part, arranged substantially radially with respect to the bearing, and a second part, arranged substantially axially with respect to the bearing.

8. The bearing assembly of claim 7, wherein the first part is a substantially planar portion which is radially oriented with respect to the bearing and the second part is a substantially part-cylindrical portion, extending over at least a part of a substantially cylindrical surface aligned substantially axially with respect to the bearing.

9. The bearing assembly of claim 1, wherein the second portion of the thermal insulation is arranged substantially opposite the first portion of the thermal insulation.

10. The bearing assembly of claim 9, wherein at least a portion of at least one of the first and second portions of the thermal insulation is substantially disc shaped.

11. The bearing assembly of claim 9, wherein the second portion of the thermal insulation is disposed between at least a part of the bearing race and the structure.

12. The bearing assembly of claim 11, wherein at least one of the first and second portions of the thermal insulation is disposed on a load path of fixing means for fixing the bearing to the structure.

13. The bearing assembly of claim 1, further comprising a pre-loading mechanism for pre-loading at least the temperature sensor against the race of the bearing.

14. The bearing assembly of claim 13, wherein the pre-loading mechanism is disposed in the housing.

15. The bearing assembly of claim 13, wherein the pre-loading mechanism comprises a threaded adjustor and/or a resilient biasing member.

16. The bearing assembly of claim 1, wherein the race comprises one or more flange portions for mounting the bearing to the structure or to a rotating component and wherein the temperature sensor is mounted substantially adjacent at least one of the flange portions.

17. The bearing assembly of claim 16, wherein plural flange portions are arranged in a substantially circular or arcuate array, and wherein the temperature sensor and/or a thermal conductor element disposed between the temperature sensor and the race to which the temperature sensor assembly is mounted are arranged substantially between an arc of the flange portions and an arc of the race.

18. The bearing assembly of claim 16, wherein the housing is attached to the race of the bearing at the one or more flange portions.

19. The bearing assembly of claim 18, wherein the bearing is attached to the structure or to a rotating component via fixing means at the flange portions and wherein the housing is attached to the flange portions by the same fixing means.

20. The bearing assembly of claim 16, wherein a conductor element, disposed between the temperature sensor and the race to which the temperature sensor assembly is mounted, comprises a profile shape arranged to mate with at least one of the flange portions, to locate the temperature sensor circumferentially on the race of the bearing.

* * * * *